(12) United States Patent
Muir

(10) Patent No.: US 6,533,185 B1
(45) Date of Patent: Mar. 18, 2003

(54) THERMAL HEATING BOARD

(76) Inventor: Morgan Muir, 1051 Folger, Berkley, CA (US) 94710

( * ) Notice: Subject to any disclaimer, the term of this patent is extended or adjusted under 35 U.S.C. 154(b) by 0 days.

(21) Appl. No.: 09/907,013

(22) Filed: Jul. 17, 2001

Related U.S. Application Data

(63) Continuation-in-part of application No. 09/451,324, filed on Nov. 30, 1999, now abandoned.
(60) Provisional application No. 60/110,693, filed on Dec. 3, 1998.

(51) Int. Cl.[7] ............................................. F24D 5/10
(52) U.S. Cl. ........................................................ 237/69
(58) Field of Search ...................... 237/69, 43; 454/185; 165/56, 49, 171

(56) References Cited

U.S. PATENT DOCUMENTS

| 3,037,746 | A | * | 6/1962 | Williams | 237/69 |
|---|---|---|---|---|---|
| 3,366,170 | A | * | 1/1968 | Welz | 237/69 |
| 4,576,221 | A | * | 3/1986 | Fennesz | 165/49 |
| 4,779,673 | A | * | 10/1988 | Chiles et al. | 165/45 |
| 4,865,120 | A | * | 9/1989 | Shiroki | 165/56 |
| 4,911,353 | A | * | 3/1990 | Deakin | 228/183 |
| 5,078,203 | A | * | 1/1992 | Shiroki | 165/56 |
| 5,454,428 | A | * | 10/1995 | Pickard et al. | 165/49 |
| 5,579,996 | A | * | 12/1996 | Fiedrich | 237/69 |
| 5,799,723 | A | * | 9/1998 | Soklolean | 165/49 |
| 5,931,381 | A | * | 8/1999 | Fiedrich | 237/69 |
| 6,092,587 | A | * | 7/2000 | Ingram | 165/56 |
| 6,283,382 | B1 | * | 9/2001 | Fitzemeyer | 237/69 |

* cited by examiner

*Primary Examiner*—Derek Boles
(74) *Attorney, Agent, or Firm*—Graybeal Jackson Haley LLP

(57) ABSTRACT

An improved hydronic radiant heating system comprising a nonstructural board having a recess formed in one surface of said board, a pipe located within said recess, and, if desired, a film of metal covering said surface of said board and having a thickness proportional to the thermal properties of said board to provide desired overall thermal characteristics for said heating system.

18 Claims, 4 Drawing Sheets

THERMAL HEATING BOARD

RELATED CASES

This invention is described in my Provisional Patent Application, Ser. No. 60/110,693, filed Dec. 3, 1998 and now expired and is a continuation in part of Utility Patent Application, Ser. No. 09/451,324, filed Nov. 30, 1999 and now abandoned.

FIELD OF INVENTION

This invention relates to construction material and is particularly directed to improved thermal heating modules for application of hydronic radiant heating in new and existing construction.

PRIOR ART

The concept of heating an area by heating the floor surface has been known since Roman times. In more recent times, such systems were formed by metal or plastic pipes embedded in concrete slabs or attached under a subfloor or sandwiched in between layers of flooring thereto by various means and by laying flooring or subflooring on top of these. More recently it has been proposed to have combinations of boards and pipes in various configurations installed either above or below a subfloor as well as integrated structural subfloor systems with an integral metal plate However, these systems have been found to be relatively inefficient in transferring heat to desired area or have been too expensive to install or have been dimensionally too thick to be usefull in retrofit applications or have had sound transmission problems due to thermal contraction 1 and expansion of poorly connected component parts, or use uncommon building practices and sequencing of installation and have been somewhat useful to new construction. Also, inserting the pipe into the grooves of the prior art boards has been unsatisfactory. Frequently, the pipe would come loose and pop out of place, causing problems with laying overflooring and the like. Thus, none of the prior art thermal heating boards have been entirely satisfactory.

BRIEF SUMMARY AND OBJECTS OF INVENTION

These disadvantages of the prior art are overcome with the present invention and an improved hydronic radiant heating system is provided which is simple and inexpensive to install and which can be applied equally well to new or existing construction and to floors, walls or ceilings, while providing efficient heating to the desired area and ensuring that the pipes are retained within the system.

These advantages of the present invention are preferably attained by providing an improved hydronic radiant heating system comprising a non-structural board formed of thermally conductive material and having at least one undercut recess formed in the upper surface of said board, a pipe releasably retained within said undercut recess, and a film of metal covering the upper surface of said board.

Accordingly, it is an object of the present invention to provide an improved hydronic radiant heating system.

Another object of the present invention is to provide an improved hydronic radiant heating system which is simple and inexpensive to install.

An additional object of the present invention is to provide an improved hydronic radiant heating system which can be applied equally well to new or existing construction, while providing efficient heating to the desired area.

A further object of the present invention is to provide an improved hydronic radiant heating system comprising a simple board rather than a complex assembly of parts.

An additional object of the present invention is to provide an improved hydronic radiant heating system which can be applied to floors, walls and ceilings.

Another object of the present invention is to provide an improved hydronic radiant heating system comprising a board that lends itself to modules which can easily be laid out and installed.

An additional object of the present invention is to provide an improved hydronic radiant heating system that lends itself to mass production with associated cost savings.

A further object of the present invention is to provide an improved hydronic radiant heating system comprising a board having a thermally conductive coating whose thickness can be varied to compensate for the conductivity of the board to achieve a desired overall thermal performance.

An additional object of the present invention is to provide an improved hydronic radiant heating system comprising a board having a groove with undercut grooves for releasably retaining a pipe within said groove.

A specific object of the present invention is to provide an improved hydronic radiant heating system comprising a nonstructural board formed of thermally conductive material having an undercut recess formed in one surface of said board and having a pipe releasably retained within said recess, Another specific object of the present invention is to provide an improved hydronic radiant heating system comprising a nonstructural board having an undercut recess formed in one surface of said board, a pipe releasably retained within said recess, and a coat of thermally conductive material applied to said surface of said board having a thickness sufficient to compensate for the thermal characteristics of said board to provide desired overall thermal performance for said system.

These and other objects and features of the present invention will be apparent from the following detailed description, taken with reference to the figures of the accompanying drawing.

BRIEF DESCRIPTION OF THE DRAWING

FIG. 2b is a view, similar to that of FIG. 2a, showing a pipe inserted into the heating system of FIG. 2a;

FIG. 3a is a view, similar to that of FIG. 1a, showing a layer of metal foil attached to the surface of a board similar to that of FIG. 1a;

FIG. 3c is a view, similar to that of FIG. 3a, showing the metal foil pressed into the recess of the board of FIG. 3a;

FIG. 4b is a view, similar to that of FIG. 4a, showing a pipe installed in the heating system of FIG. 4a.

DETAILED DESCRIPTION OF THE INVENTION

Figure 1A:
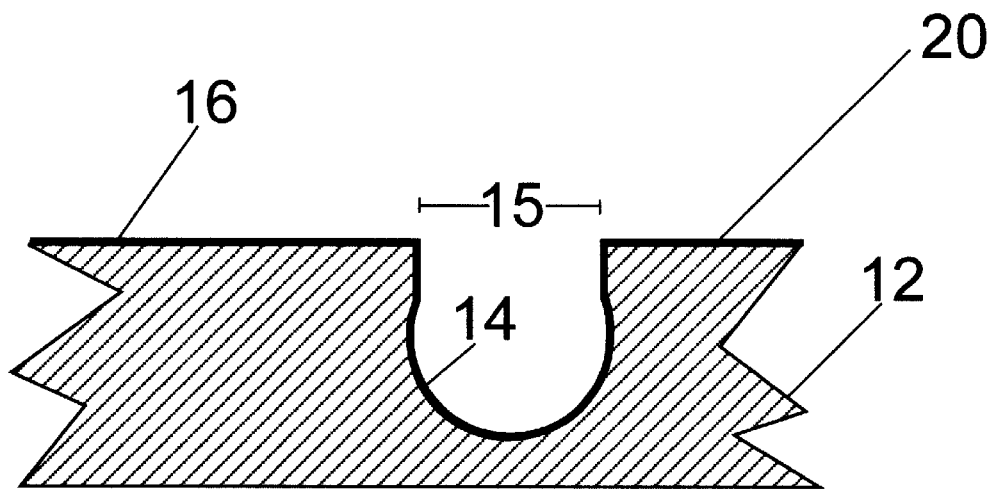
FIG. 1a is a vertical section through a floor heating system embodying the present invention.
Figure 1B:
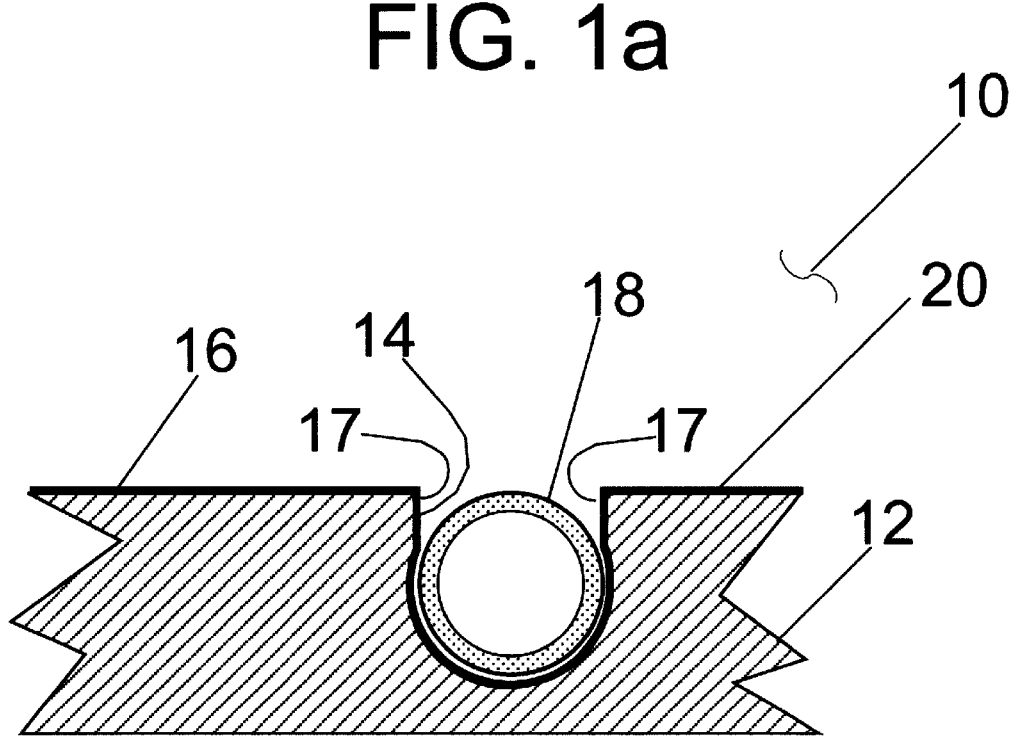
FIG. 1b is a view, similar to that of FIG. 1a, showing a pipe inserted into the recess of the heating system of FIG. 1.

In the form of the present invention chosen for purposes of illustration in the drawing, FIG. 1a shows a hydronic radiant heating system, indicated generally at 10, comprising a supporting board 12 having a recess 14 formed in the upper surface 16 of the board 12 and having a pipe 18 located within the recess 14, with a coat 20 of thermally conductive material, such as metal spray, metal foil or the like deposited on the upper surface 16 of the board 12. As seen in FIG. 1*b*, the recess 14 is undercut, providing an opening 15 with flanges 17 which overlie the pipe 18 after the pipe 18 has been inserted into the recess 14. The pipe 18 sufficiently resilient to allow the pipe 18 to be inserted through the opening 15 and to snap back to overlie the pipe 18, as seen in FIG. 1*b*. This serves to releasably retain the pipe 18 and ensures that the pipe 18 cannot become dislodged or otherwise displaced. The supporting board 12 may be a wooden board or, if desired, may be plywood, fiberboard, recycled material or other suitable supporting material.

In use, the hydronic radiant heating system 10 is applied over a suitable subfloor over wall framing, under ceiling framing or over a concrete slab or over an existing floor, then the pipe 18 is forced into recess 14 so that flanges 17 overlie and releasably retain the pipe 18 and the finished floor, wall or ceiling goods are installed over the hydronic radiant heating system 10. (In the case of its use for radiant hydronic ceiling heat the finished goods are installed below the board 12) Heated water or the like is circulated through the pipe 18 and transfers heat by conductivity and radiation through the new floor to the desired area. The thermally conductive coat 20 can be varied to compensate for the varying conductive qualities of the supporting board 12. Thus, the thickness of the thermally conductive coat 20 could vary proportionally to the thermal properties of the supporting board 12. (More conductive board would have a thinner coating, while less conductive board would have a thicker coating.) The thermally conductive coat 20 may be applied to the upper surface 16 of the supporting board 12 by spraying or by applying one or more layers of metal foil or the like. Thus, the thickness of the coat 20 can be extremely thin, yet serves to effectively and efficiently transfer heat from the pipe 18 to the coat 20 and, hence, to the desired area.

Figure 2A:
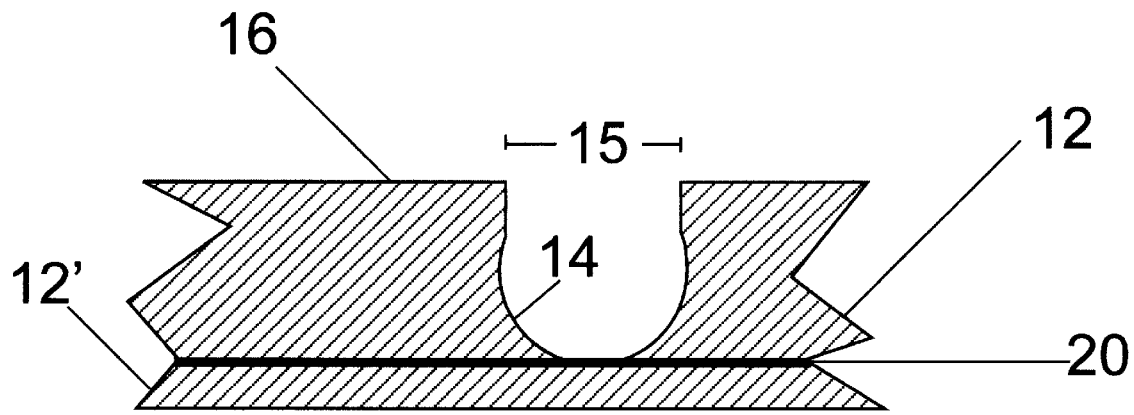
FIG. 2a is a view, similar to that of FIG. 1a, showing an alternative form of the floor heating system of FIG. 1.
Figure 2B:
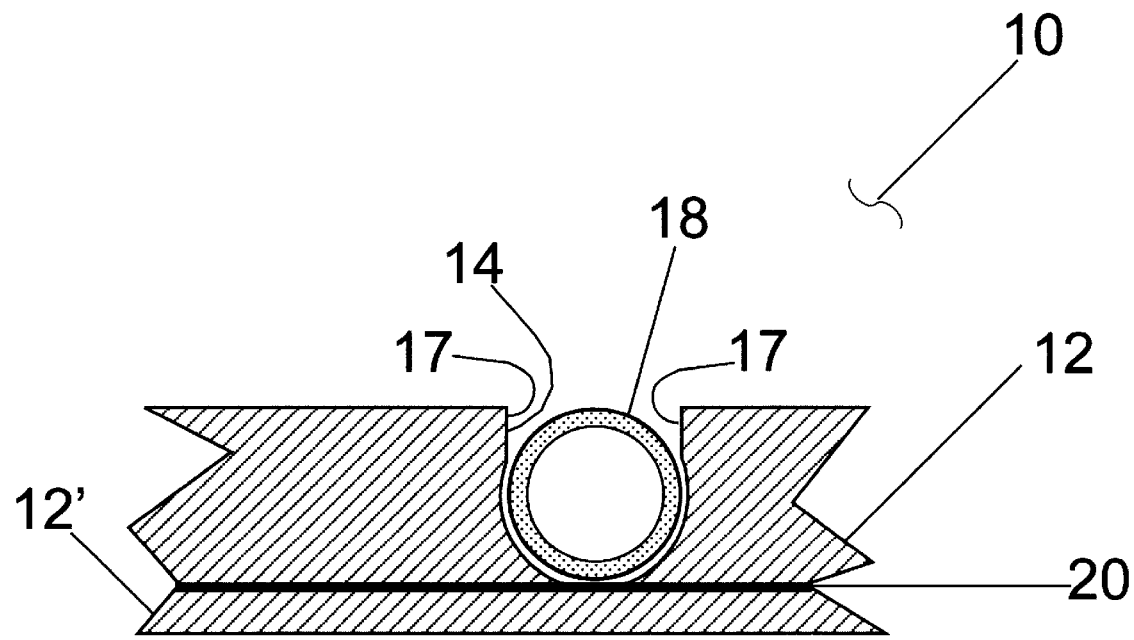

FIGS. 2*a* and 2*b* show an alternative form of the heating system of FIG. 1*a* wherein two supporting boards 12 and 12' are provided and the conductive coating 20 is applied between the boards 12 and 12'. This would allow the components to be manufactured separately and, subsequently, to be laminated together at a convenient time and location.

Figure 3A:
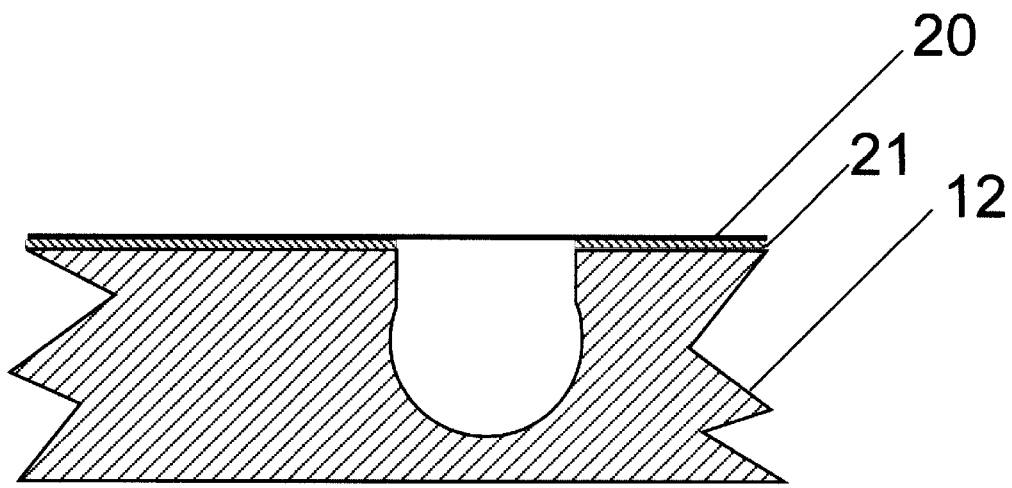

FIG. 3*a* shows the board 12 having a layer of metal foil 20 attached to the board 12 by suitable means, such as adhesive 21, and overlying the recess 14.

Figure 3B:
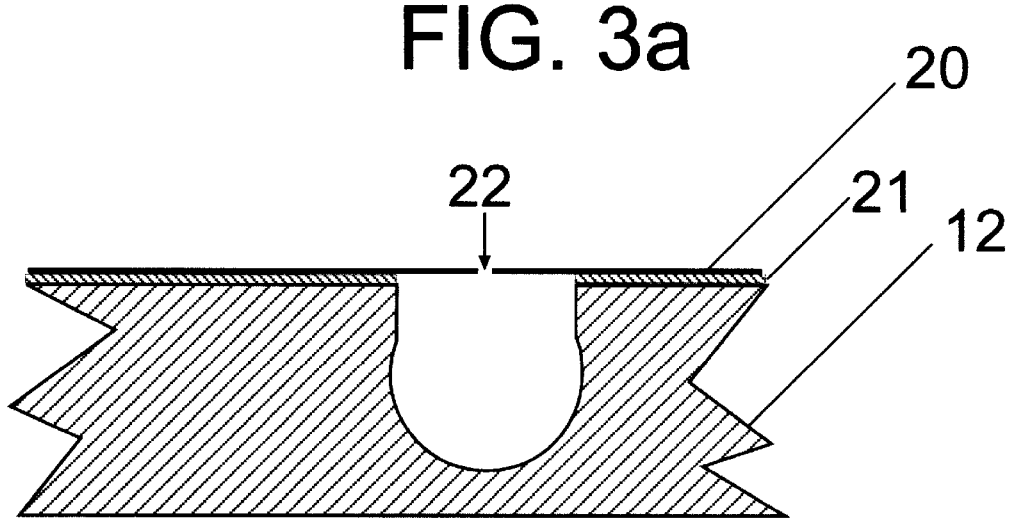
FIG. 3b is a view, similar to that of FIG. 3a, showing the metal foil having been slit.
Figure 3C:
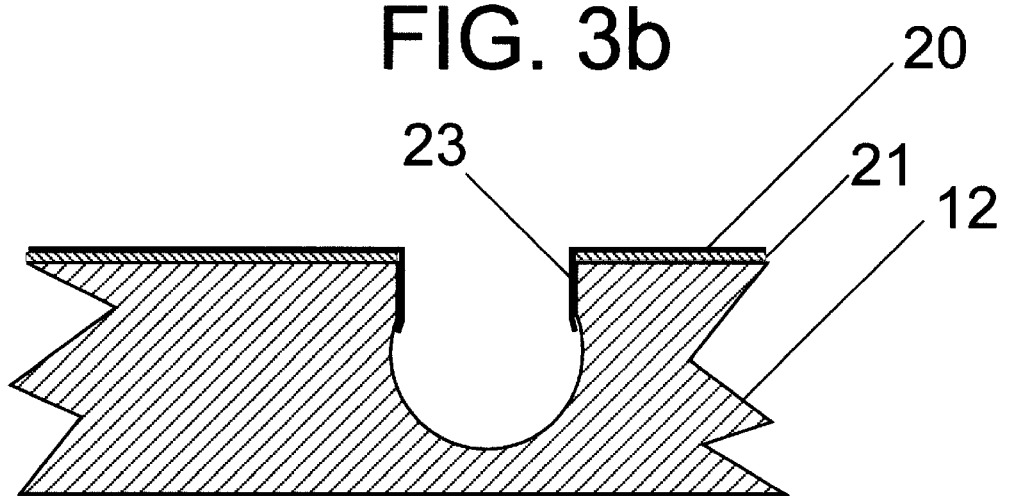

Obviously, if desired, the metal layer 20 could be applied by plating or other well known means. After the metal layer 20 has been attached to the board 12, the metal layer is slit, as seen at 22 in FIG. 3*b*, and the portions of thematel layer 20 are then pressed into the recess 14, as seen at 23 in FIG. 3*c*. This provides a very simple and inexpensive means of manufacturing the board of FIG. 1*a*.

Figure 4A:
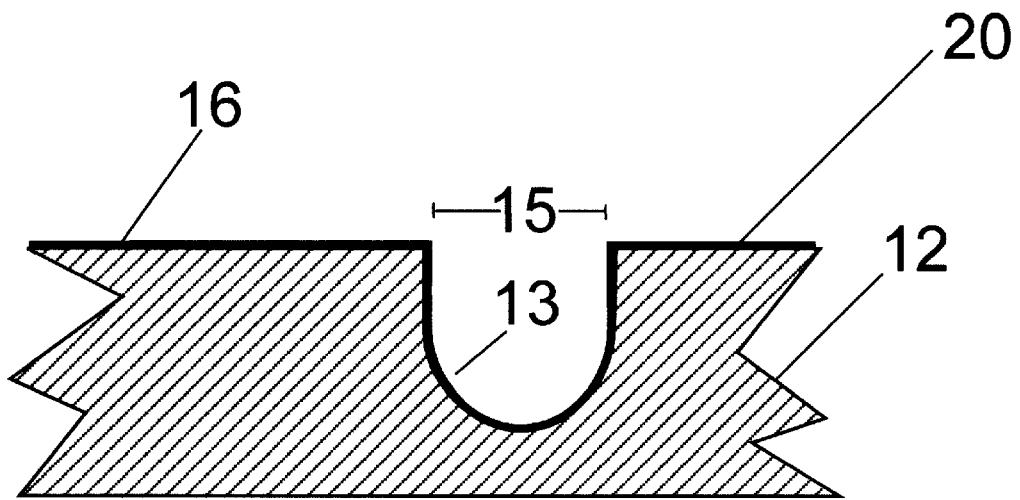
FIG. 4a is a view, similar to that of FIG. 1, showing an alternative form of the heating system of FIG. 1.
Figure 4B:
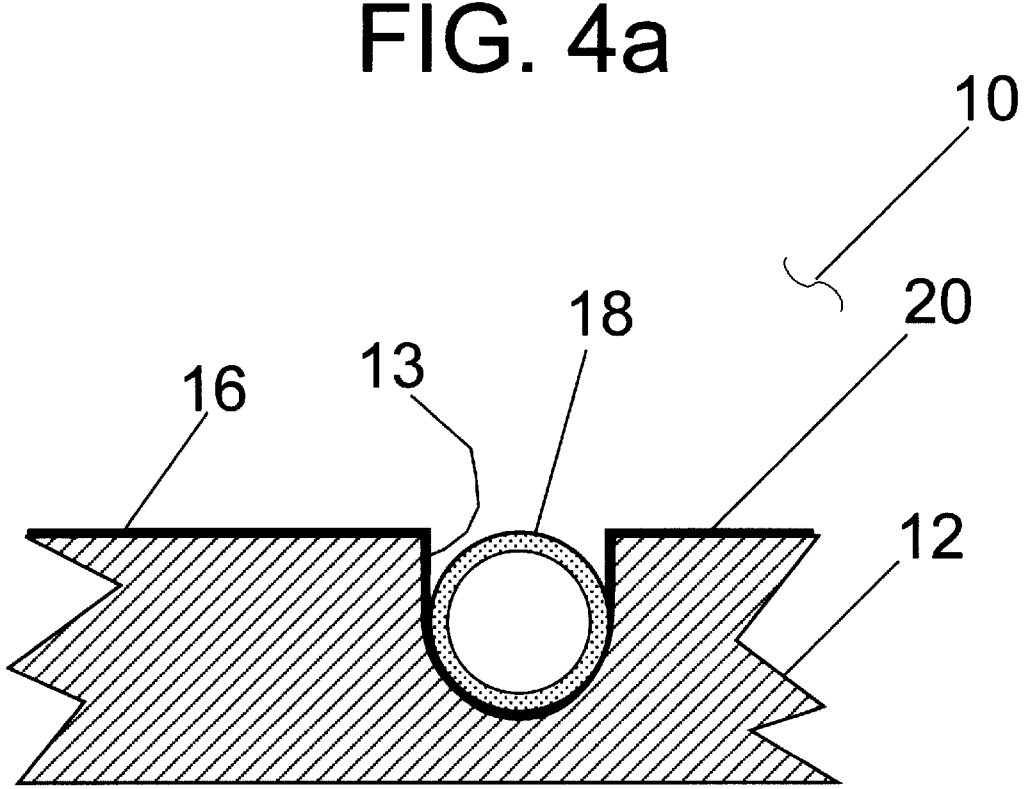

FIG. 4*a* shows an alternative form of the board 12 having the surface 13 of the recess 14 serrated or otherwise prepared to frictionally retain the pipe 18 when the pipe 18 is forcefully inserted into the recess 14.

Obviously, numerous variations and modifications can be made without departing from the spirit of the present invention. Therefore, it should be clearly understood that the form of the present invention described above and shown in the accompanying drawing is illustrative only and is not intended to limit the scope of the present invention.

What is claimed is:

1. A board for hydronic radiant heating, comprising a floor supportive board of low elasticity having a surface with at least one groove in the surface for receiving a hydronic pipe, the surface covered, at least in part, by a heat conductive layer of metal foil.

2. The board of claim 1 wherein the layer of metal foil is adhered to the surface with an adhesive.

3. The board of claim 1 wherein the groove has two sides and, at one or both sides of the groove, the layer of metal foil is bent into the groove.

4. The board of claim 1 further comprising a second layer of metal foil adhered to the layer of metal foil.

5. The board of claim 1 wherein the groove has a surface and the layer of metal foil covers substantially all of the surface of the groove.

6. A method for making a set of modular boards having uniform length, width, and edges for assembling edge to edge for hydronic radiant heating, each board having at least one groove for receiving a hydronic pipe, the method comprising cutting into a surface of the board at least one groove which is undercut on at least one side of the groove to releasably retain the pipe, the groove extending continuously from an edge of the board to an edge of the board.

7. The method of claim 6 wherein the groove forms a recess in the surface of the board and a layer of metal is adhered to the surface, extending part way into the recess but not more than about half way into the recess such that the undercut is formed, at least in part, by at least one edge of the layer of metal.

8. The method of claim 7 wherein the layer of metal is adhered to the board, spanning the groove, after the groove is cut, and then the layer is cut along a length of the groove to form two edges of the layer which are then bent into the groove.

9. The method of claim 6 wherein the board is comprised of fiberboard.

10. The method of claim 6 wherein the layer of metal is foil.

11. The board for hydronic radiant heating made by the method of claim 6.

12. The board for hydronic radiant heating made by the method of claim 7.

13. The board for hydronic radiant heating made by the method of claim 8.

14. The board for hydronic radiant heating made by the method of claim 9.

15. A set of modular boards for hydronic radiant heating, comprising a plurality of boards having uniform length, width, and edges for assembling edge to edge, each board made of a continuous material having a thickness and at least one groove in the board for receiving a hydronic pipe, wherein the at least one groove extends through substantially more than half the thickness of the board but not entirely through the board.

16. The set of boards of claim 15 wherein each board is comprised of fiberboard.

17. The set of boards of claim 15 wherein the at least one groove is formed in a surface of the board and a layer of metal foil is adhered to the surface.

18. The set of boards of claim 15 wherein the groove has two sides and at least one side of the groove is serrated to frictionally retain the pipe.

\* \* \* \* \*